United States Patent [19]

Yoshida

[11] Patent Number: 4,975,927
[45] Date of Patent: Dec. 4, 1990

[54] DEMODULATOR WITH COMPOSITE TRANSVERSAL EQUALIZER AND EYE DETECTION CLOCK SYNCHRONIZER

[75] Inventor: Yasuharu Yoshida, Tokyo, Japan

[73] Assignee: NEC Corporation, Tokyo, Japan

[21] Appl. No.: 434,750

[22] Filed: Nov. 13, 1989

[30] Foreign Application Priority Data

Nov. 10, 1988 [JP] Japan .................................. 63-285005

[51] Int. Cl.$^5$ .................... H04B 3/06; H04L 27/38
[52] U.S. Cl. ..................................... 375/015; 329/304; 375/80; 375/86; 375/106
[58] Field of Search ........................ 375/12, 14, 15, 39, 375/80, 82, 86, 97, 106; 329/304, 306, 307, 308; 333/18

[56] References Cited

U.S. PATENT DOCUMENTS

| | | | |
|---|---|---|---|
| 4,627,072 | 12/1986 | Ryu et al. ............................ | 375/14 |
| 4,859,956 | 8/1989 | Mizoguchi ........................... | 329/304 |
| 4,908,838 | 3/1990 | Mizoguchi ........................... | 375/106 |

Primary Examiner—Benedict V. Safourek
Attorney, Agent, or Firm—Sughrue, Mion, Zinn, Macpeak & Seas

[57] ABSTRACT

In a digital demodulator, a recovered baseband signal is sampled in response to a clock pulse supplied from a VCO and converted to a digital signal representing one of multilevels of the sampled signal. Real-axis and imaginary-axis transversal equalizers are provided. Each equalizer has a tapped delay line for receiving the digital signal, a plurality to tap weight multipliers connected respectively to taps of the tapped delay line, and an adder. The adder of the real-axis transversal equalizer sums all outputs of the tap weight multipliers except for the output of one which is connected to a tap adjacent to the center tap for producing a partially equalized signal, while the adder of the other equalizer sums all outputs of the tap weight multipliers for producing a fully equalized signal. Both of the equalized signals are summed by an adder and applied to a phase control circuit which derives from it a VCO control signal so that it corresponds to a tap-weight control signal applied to the multiplier whose output is excluded from being summed by the adder of the real-axis transversal equalizer. The output of the adder is summed with the excluded multiplier output and supplied to a tap weight controller which controls the multipliers of both transversal equalizers.

6 Claims, 5 Drawing Sheets

Real-Axis Transversal Equalizer 3P

DEMODULATOR WITH COMPOSITE TRANSVERSAL EQUALIZER AND EYE DETECTION CLOCK SYNCHRONIZER

BACKGROUND OF THE INVENTION

The present invention relates generally to digital demodulators, and more particularly to a digital demodulator comprising A/D converters for multilevel discrimination and digital transversal equalizers for compensating for intersymbol interference.

Analog-to-digital converters employed in a digital demodulator use $(n+1)$ bits or more for discriminating the $2^n$ levels of a demodulated $2^{2n}$-QAM (quadrature amplitude modulation) signal and representing the discriminated level with the higher n bits which form a main data signal corresponding to the original data signal. The $(n+1)$th or lower bit of the A/D converter output indicates the amount of deviation of the discriminated level from an optimum level and is used to derive a control signal for use in a closed loop circuit.

Transversal equalizers with variable tap weights are in current use for adaptively compensating for intersymbol interferences resulting from distortion of received digital signals. If transversal equalizers are used to process the output of an analog-to-digital converter, the variable tap weights are controlled by control signals which are derived from logical products of the most significant bit of the higher n-bit and the $(n+1)$th lower bit of the A/D converter output. One advantage of the transversal equalizers lies in their abilities to compensate for a small deviation of demodulated signal at each sample point.

The error signal is also used in an eye detection clock synchronizer which is capable of generating jitter-free clock pulses. Using the MSB of the main data signal that arises one clock before or after a sample point, the clock synchronizer estimates the polarity of time differentiation of a demodulated baseband signal at the sample point and determines from the estimated polarity and the error bit on which side of an optimum point the sample point is located. A control signal is derived from this determination to establish clock synchronization.

SUMMARY OF THE INVENTION

It is therefore advantageous to combine the capabilities of both digital transversal equalizers and an eye detection clock synchronizer as subsystems of a digital demodulator in order to operate A/D converters at sample times precisely determined by the clock synchronizer so that the digital signals at the inputs of the equalizers are accurate representations of the multilevels of a demodulated QAM signal.

One approach to the combined use of digital transversal equalizers and an eye detection clock synchronizer is to provide a circuit that controls one of the tap weights of the transversal equalizers by a signal which is also used to control the clock synchronizer. However, this results in a mutual interference between the two subsystems, so they fail to converge to their optimum operating points. Another approach would be to derive the clock timing for A/D converters from the output signals of these A/D converters, i.e., the inputs of the transversal equalizers. However, the outputs of A/D converter are affected by intersymbol interferences, and hence precision clock timing is difficult to establish.

The present invention is based on the discovery that the control signal that is used to control an eye detection clock synchronizer is identical to the one used to control the weight of a tap which is one tap displaced in either direction from the center tap of the real-axis circuit of a composite transversal equalizer.

It is therefore an object of the present invention to provide a digital demodulator in which composite transversal equalizers and an eye detection clock synchronizer are combined to operate to their maximum capabilities.

According to a broader aspect of the present invention, a digitally modulated signal is demodulated to a baseband signal which is sampled in response to a clock pulse supplied from a variable frequency oscillator and converted to a multibit digital signal representing one of multilevels of the sampled baseband signal. A real-axis transversal equalizer and an imaginary-axis transversal equalizer are provided. Each of the transversal equalizers has a tapped delay line for receiving the digital signal, a plurality of tap weight multipliers connected respectively to taps of the tapped delay line, and an adder. The adder of the real-axis transversal equalizer sums all outputs of the tap weight multiplier except for the output of the tap weight multiplier which is connected to a tap adjacent to the center tap for producing a partially equalized signal, while the adder of the imaginary-axis transversal equalizer sums all outputs of the tap weight multipliers for producing a fully equalized signal. The partially equalized signal and the fully equalized signal are summed by a first adder and applied to a clock synchronizer, or phase control circuit which derives a control signal so that it corresponds to a tap-weight control signal applied to the multiplier whose output is excluded from being summed by the adder of the real-axis transversal equalizer. The variable frequency oscillator is controlled in accordance with the control signal from the phase control circuit. A second adder sums the output of the first adder with the multiplier output which is excluded from being summed by the adder of the real-axis transversal equalizer. A tap weight controller is responsive to the output of the second adder to control the tap weight multipliers of both transveral equalizers.

For eliminating problems associated with multipath fading which arises in a mode called "non-minimum fades" in which signals on the secondary path are stronger than those on the primary path, or in a mode called "minimum fades" in which signals on the primary path are stronger than those on the secondary path, the present invention provides a QAM (quadrature amplitude modulation) demodulator in which a received QAM signal is demodulated to recover an in-phase baseband signal and a quadrature baseband signal. A first analog-to-digital converter samples the in-phase baseband signal in response to a clock pulse supplied from a variable frequency oscillator and converts the sampled in-phase baseband signal to an in-phase multibit digital signal representing one of multilevels of the sampled in-phase baseband signal. A second analog-to-digital converter samples the quadrature baseband signal in response to the clock pulse and converts the sampled quadrature baseband signal to a quadrature multibit digital signal representing one of multilevels of the sampled quadrature baseband signal. First and second real-axis transversal equalizers are connected to the outputs of the first and second A/D converters, respectively, and first and second imaginary-axis transversal equalizers are connected to the outputs of the second and first A/D converters, respectively. The first real-axis transversal equalizer has a tapped delay line, a plurality of tap weight multipliers connected respectively to taps of the tapped delay line, and an adder for summing all outputs of the tap weight multipliers except for the output of the tap weight multiplier which is connected to a tap displaced from the center tap in the direction of signals propagating along the delay line for producing a first partially equalized signal. The second real-axis transversal equalizer has a tapped delay line, a plurality of tap weight multipliers connected respectively to taps of the tapped delay line, and an adder for summing all outputs of the tap weight multipliers except for the output of the tap weight multiplier which is connected to a tap displaced from the center tap in a direction opposite to the direction of signals propagating along the delay line for producing a second partially equalized signal. Each of the first and second imaginary-axis transversal equalizers has a tapped delay line, a plurality of tap weight multipliers connected respectively to taps of the tapped delay line, and an adder for summing all outputs of the tap weight multipliers for producing a fully equalized signal. The first partially equalized signal from the first real-axis transversal equalizer and the output of the first imaginary-axis transversal equalizer are summed in a first adder. The output of the first adder is summed by a second adder with the output which is excluded from being summed by the adder of the first real-axis transversal equalizer. The second partially equalized signal from the second real-axis transversal equalizer and the output of the second imaginary-axis transversal equalizer are summed by a third adder. The output of the third adder is summed with the output which is excluded from being summed by the adder of the second real-axis transversal equalizer. An eye comparator is provided for determining which one of the outputs of the first and third adders has an eye pattern with a greater aperture. A phase control circuit responds to one of the outputs of the first and third adders by controlling the variable frequency oscillator in accordance with the determination of the eye comparator. A tap weight controller controls the tap weight multipliers of all of the first and second real-axis transversal equalizers and the first and second imaginary-axis transversal equalizers in accordance with output signals from the second and fourth adders.

BRIEF DESCRIPTION OF THE DRAWINGS

The present invention will be described in further detail with reference to the accompanying drawings, in which.

DETAILED DESCRIPTION

Figure 1:
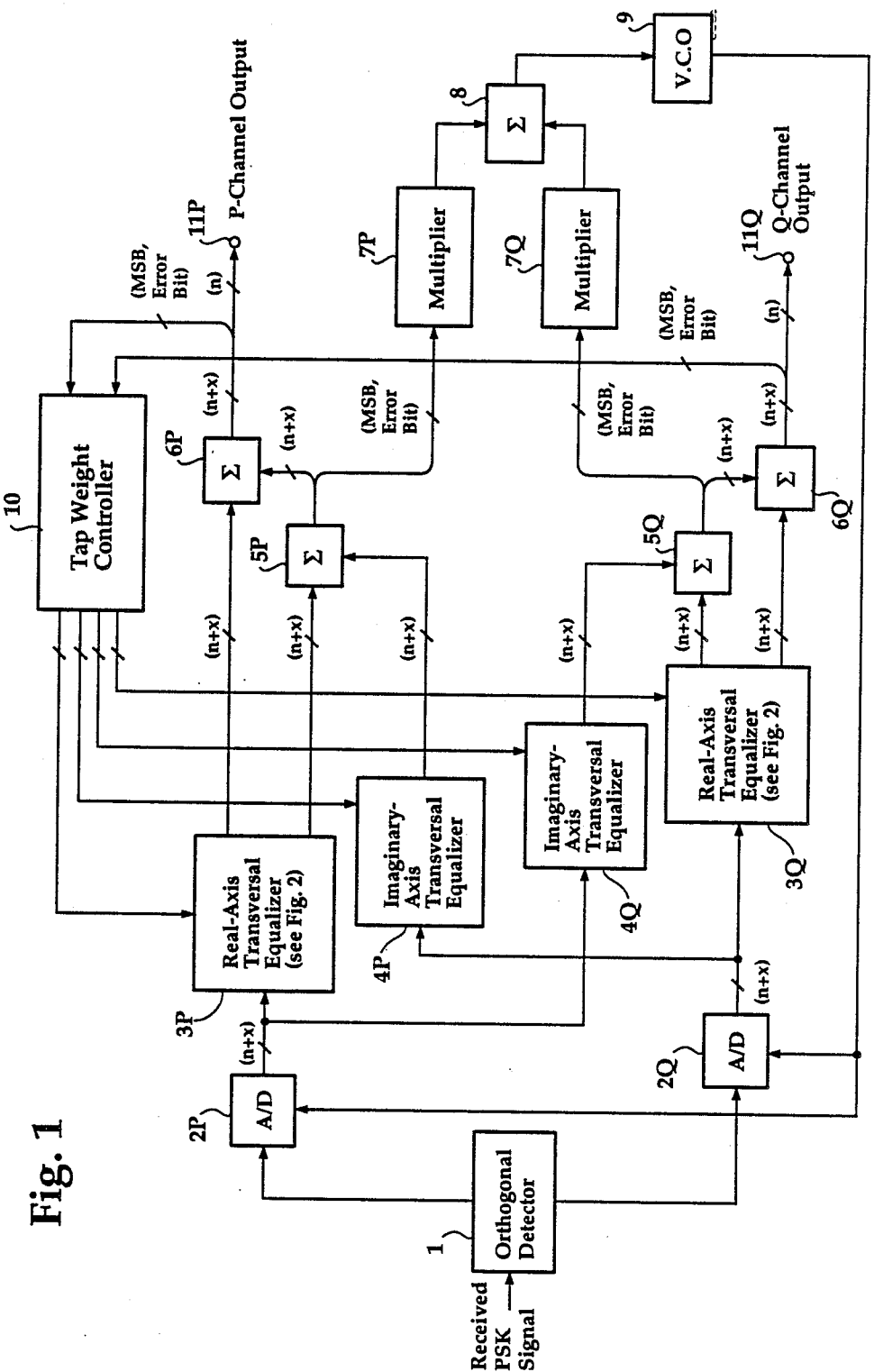
FIG. 1 is a block diagram of a demodulator according to a first embodiment of the present invention.

Referring now to FIG. 1, there is shown a $2^{2n}$-QAM (quadrature amplitude modulation) demodulator according to a first embodiment of the present invention. The demodulator includes an orthogonal detector 1 which provides demodulation on an incoming $2^{2n}$-QAM signal to produce an in-phase, or P-channel baseband signal and a quadrature, or Q-channel baseband signal. Analog-to-digital converters 2P and 2Q are connected to the respective outputs of orthogonal detector 1 to discriminate the levels of the respective P- and Q-channel baseband signals to generate a P-channel (n+x)-bit signal and a Q-channel (n+x)-bit signal, where x an integer equal to or greater than 3. The (n+x)-bit outputs of A/D converter 2P are supplied in a bit-parallel fashion to a real-axis transversal equalizer 3P and an imaginary-axis transversal equalizer 4Q of conventional design. The (n+x)-bit outputs of A/D converter 2Q are likewise supplied to a real-axis transversal equalizer 3Q and an imaginary-axis transversal equalizer 4P of a conventional design.

Both imaginary-axis transversal equalizers 4P and 4Q sequentially receive tap-weight control signals from a tap weight controller 10 to compensate for interferences between sucessive symbols on the imaginary axes in a manner known in the art and produce (n+x)-bit outputs on the imaginary axes. However, both real-axis transversal equalizers 3P and 3Q are different from the conventional design as shown in FIG. 2.

Figure 2:
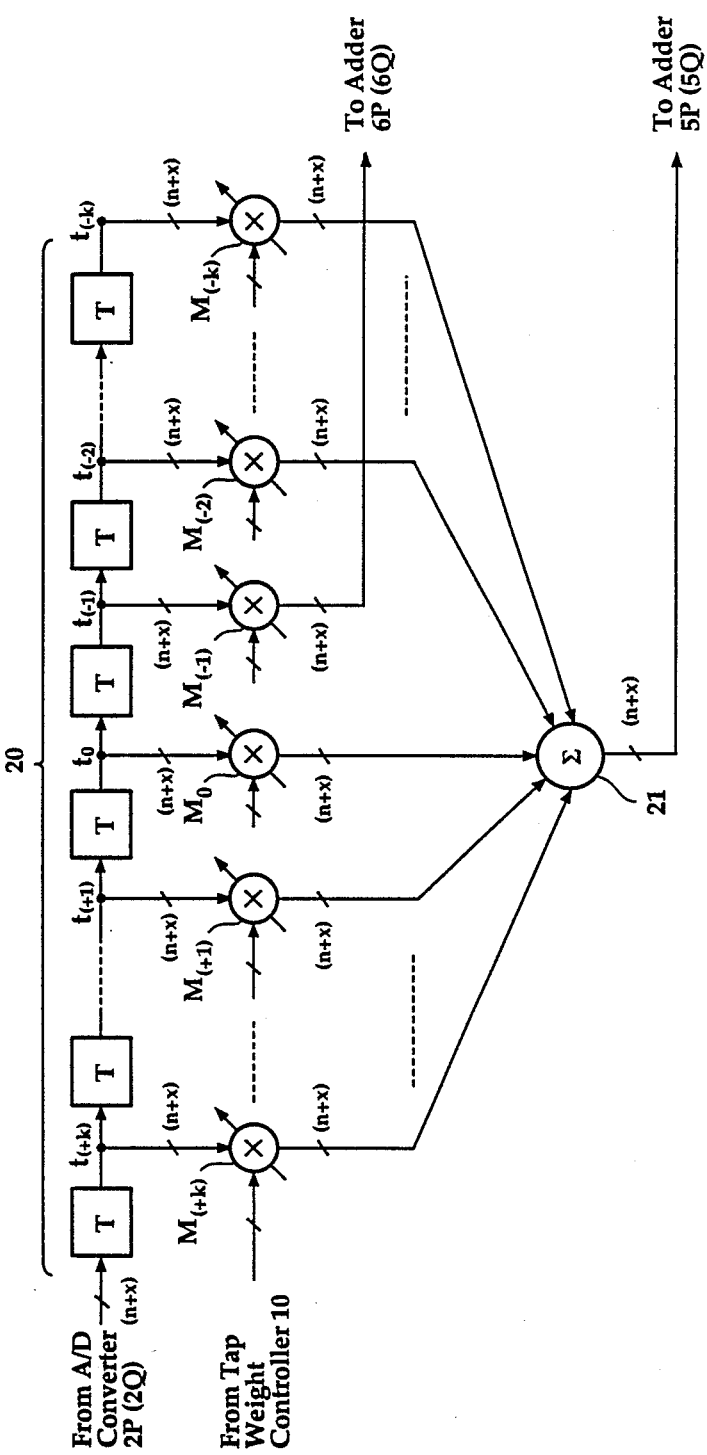
FIG. 2 is a circuit diagram of each of the real-axis transversal equalizers of FIG. 1.

In FIG. 2, each of the real-axis transversal equalizers 3P and 3Q comprises a tapped delay line 20 consisting of (n+x)-bit digital delay elements of duration T connected in series from the output of A/D converter 2P (or 2Q) so that (2k+1) taps designated $t_{(+k)}$ to $t_{(-k)}$ are successively formed at the outputs of the delay elements, with a tap successively formed at the outputs of the delay elements, with a tap $t_0$ being the center tap. A plurality of tap weighting elements, or digital multipliers $M_{(+k)}$ to $M_{(-k)}$ are respectively connected to taps $t_{(+k)}$ to $t_{(-k)}$ to multiply the successively delayed (n+x)-bit signals from the taps by respective digital tap-weight control signals which are sequentially supplied from tap weight controller 10.

Real-axis transversal equalizers 3P and 3Q differ from the conventional design in that, with the exception of an (n+x)-bit output from multiplier $M_{(-1)}$ which is located one tap away from the center-tap multiplier $M_0$ in the direction of propagation of signals through the tapped-delay line 20, all outputs of the multipliers are summed in an adder 21 to produce an (n+x)-bit equalizer output. These multipliers control the magnitude of the signals at all taps except for $t_{(-1)}$ so that interferences between successive symbols on the real axes are partially compensated for at the output of adder 21. Multiplier $M_{(-1)}$ compensates for intersymbol interferences that occur on successive signals at the tap $t_{(-1)}$.

Returning to FIG. 1, the (n+x)-bit output of adder 21 of equalizer 3P is supplied to an adder 5P where it is summed with the fully compensated signal on the imaginary-axis supplied from equalizer 4P, while the (n+x)-bit output of multiplier $M_{(-1)}$ of equalizer 3P is supplied to an adder 6P where it is summed with the output of adder 5P to produce a P-channel output signal which is fully compensated on the real-axis as well as on the imaginary-axis. Likewise, the (n+x)-bit output of adder 21 of equalizer 3Q is supplied to an adder 5Q where it is summed with the fully compensated signal on the imaginary-axis from equalizer 4Q, while the (n+x)-bit output of multiplier $M_{(-1)}$ of equalizer 3Q is supplied to an adder 6Q where it is summed with the output of adder 5Q to produce a Q-channel output signal which is fully compensated on the real-axis as well as on the imaginary-axis.

The MSB and an error bit of the (n+x)-bit outputs of adders 6P and 6Q are supplied to the tap weight controller 10, while the higher n bits of the outputs of adders 6P and 6Q are supplied to output terminals 11P and 11Q, respectively, as P-channel and Q-channel main data signals. Controller 10 multiplies the MSB and the error bit from adder 6P to produce a tap-weight control signal for application to the P-channel real-axis transversal equalizer 3P and multiplies the MSB of the output of adder 6P and the error bit of the output of adder 6Q are multiplied to produce a tap-weight control signal for application to the P-channel imaginary-axis transversal equalizer 4P.

In a similar manner, controller 10 multiplies the MSB and the error bit from adder 6Q to produce a tap-weight control signal for application to the Q-channel real-axis transversal equalizer 3Q and multiplies the MSB of the output of adder 6Q and the error bit of the output of adder 6P are multiplied to produce a tap-weight control signal for application to the Q-channel imaginary-axis transversal equalizer 4Q.

The tap-weight control signals are supplied sequentially to equalizers 3P,3Q,4P,4Q so that equalizers 3P and 3Q produce partially compensated real-axis signals, while equalizers 4P and 4Q produce fully compensated imaginary-axis signals.

According to the present invention, the bit timing signal that is used to control an eye detection clock synchronizer is found to be identical to the one used to control the weight of a tap which is one tap displaced from the center tap of a real-axis transversal equalizer.

As described above, the output of adder 5P does not contain the output of multiplier $M_{(-1)}$ of equalizer 3P, while the output of adder 5Q does not contain the output of multiplier $M_{(-1)}$ of equalizer 3Q. According to this invention, the MSB and an error bit (or "n+1"th bit) of the output of adder 5P are supplied to a digital multiplier 7P where they are multiplied together to produce a bit timing control signal which is identical to the tap-weight control signal applied to the multiplier $M_{(-1)}$ of equalizer 3P. Likewise, the MSB and an error bit of the output of adder 5Q are supplied to a digital multiplier 7Q where they are multiplied together to produce a bit timing control signal which is identical to the tap-weight control signal applied to the multiplier $M_{(-1)}$ of equalizer 3Q.

The bit timing control signals developed by multipliers 7P and 7Q are preferably summed together by a summing amplifier 8 and fed to a voltage-controlled oscillator 9. The output of VCO 9 corresponds to the bit timing control signal of an eye detection clock synchronizer, and is supplied to the A/D converters 2P and 2Q as a sampling pulse. The timing of the VCO output is feedback-controlled so that the outputs of orthogonal detector 1 are sampled at precisely controlled timing.

It is seen from the foregoing that the tap-weight control signals for multipliers $M_{(-1)}$ of both real-axis transversal equalizers 3P and 3Q are derived from signals which contain the outputs of these multipliers, while the VCO control signal is derived from signals which do not contain such outputs in the same logical process as used to derive their tap-weight control signals. Therefore, the clock control subsystem is isolated from the equalizer control subsystem, allowing clock recovery and intersymbol interference compensation to operate independently on their optimum points. Since the partially compensated signals are used to derive the bit control timing, the clock pulses recovered by the VCO 9 contains a small amount of jitter.

In the embodiment of FIG. 1, the input signal of each of adders 5P and 5Q is derived from multiplier $M_{(-1)}$ of the respective equalizers 3P and 3Q which is located one tap away from the center-tap multiplier $M_0$ in the direction of propagation of signals along the tapped delay line 20. Note that the inputs of adders 5P and 5Q could equally be as well derived from multipliers M which are located one tap away from the center-tap multipliers $M_0$ in a direction opposite to the direction of propagation of signals along the tapped delay line 20.

With high-frequency radio transmission, the primary concern is a phenomenon called multipath fading which arises as a result of atmospheric refraction. Multipath fading involves two modes, i.e., non-minimum fades in which signals on the secondary path are stronger than those on the primary path, and minimum fades in which signals on the primary path are stronger than those on the secondary path.

According to a second embodiment of the present invention, the intersymbol interference caused by non-minimum fades is found to be effectively equalized by utilizing a partially equalized signal of a real-axis transversal equalizer which excludes the output of a tap-weight multiplier $M_{(+1)}$ located one tap away from the center tap-weight multiplier $M_0$ in a direction opposite to the direction of propagation of signals on a tapped delay line of the equalizer, while the intersymbol interference caused by minimum fades is found to be effectively equalized by utilizing a partially equalized signal of the real-axis transversal equalizer which excludes the output of a tap-weight multiplier $M_{(-1)}$ located one tap away from the center tap-weight multiplier $M_0$ in the direction of propagation of signals on the tapped delay line.

Figure 3:
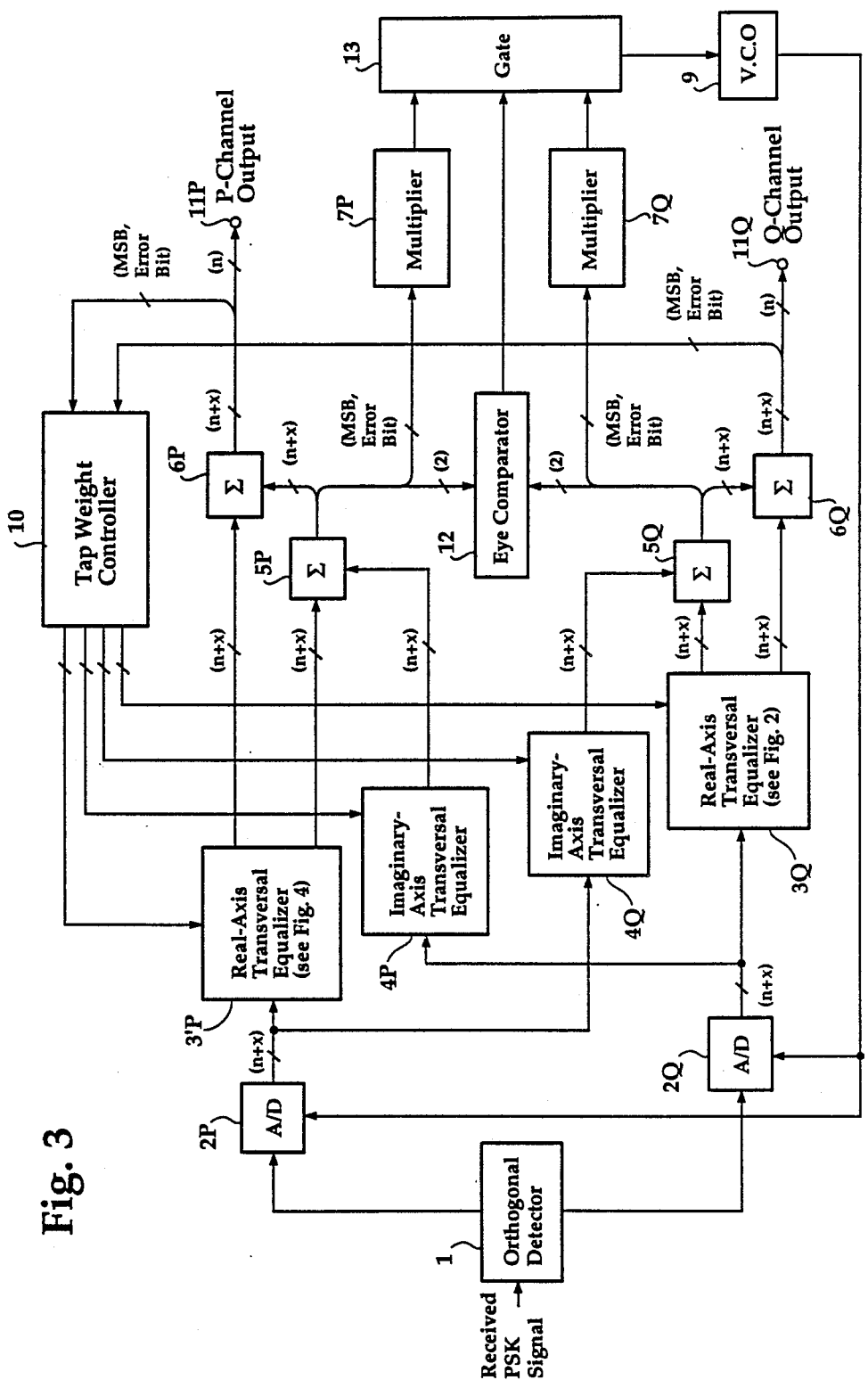
FIG. 3 is a block diagram of a demodulator according to a second embodiment of the present invention.

FIG. 3 is an illustration of the second embodiment of the present invention. In this embodiment, the real-axis transversal equalizer 3P of FIG. 1 is replaced with a real-axis transversal equalizer 3'P which is shown in detail in FIG. 4, and an eye comparator 12 is provided to detect which one of the (n+x)-bit outputs of adders 5P and 5Q has an eye pattern of greater aperture. The outputs of multipliers 7P, 7Q and eye comparator 12 are coupled to a gate 13 to apply one of the outputs of adders 5P, 5Q having a greater eye aperture to the control input of VCO 9 in accordance with a signal from the eye comparator 12.

Figure 4:
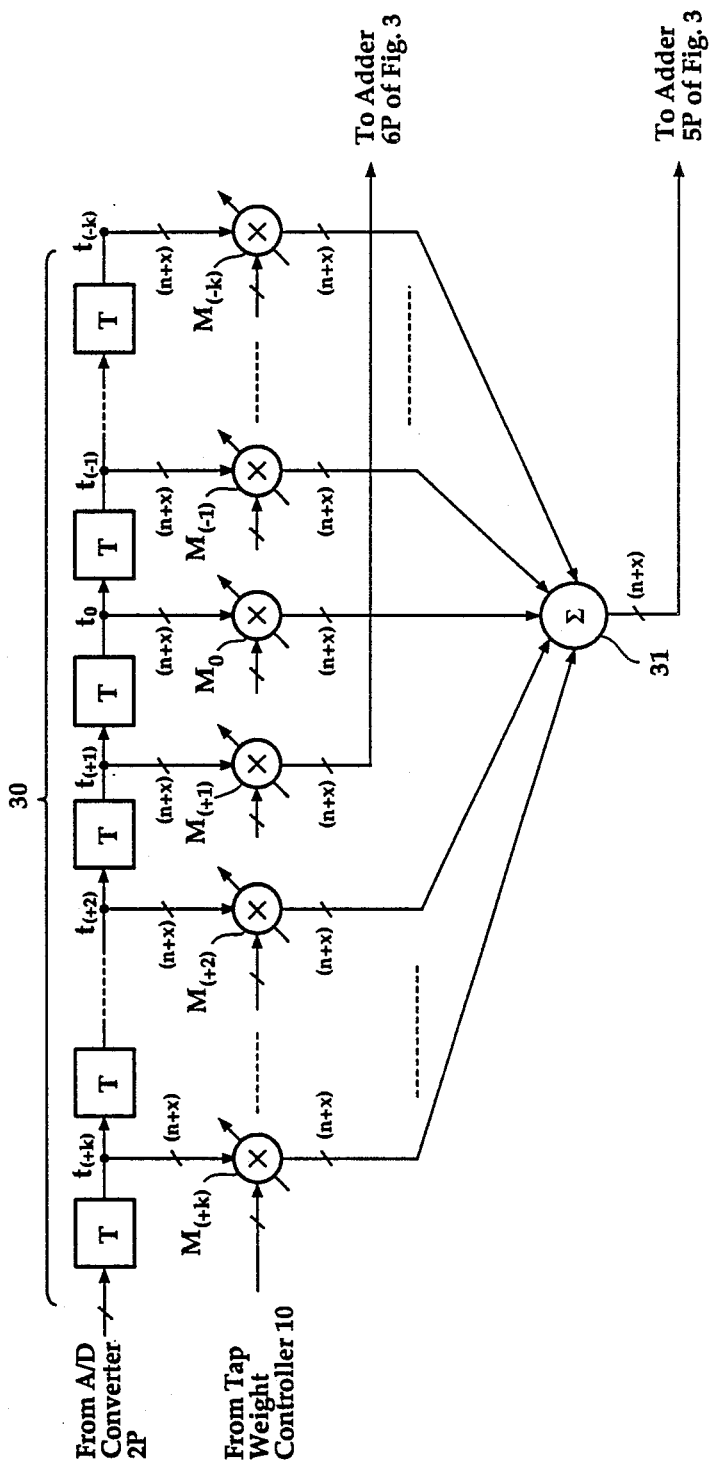
FIG. 4 is a circuit diagram of the P-channel real-axis transversal equalizer of FIG. 3.

As shown in FIG. 4, real-axis transversal equalizer 3'P has a tapped-delay line 30 having successive taps $t_{(+k)}$ to $t_{(-k)}$, with a tap $t_0$ being the center tap as in FIG. 2. Tap-weight multipliers $M_{(+k)}$ to $M_{(-k)}$ are respectively connected to the taps $t_{(+k)}$ to $t_{(-k)}$. This transversal equalizer differs from the conventional design in that the output of multiplier $M_{(+1)}$ is used as the input of adder 6P of FIG. 3 and the outputs of all the other multipliers are summed by an adder 31 and supplied to adder 5P of FIG. 3. Multiplier 7P multiplies the MSB and an error bit of the output of adder 5P to derive a timing control signal which is identical to the tap weight of the multiplier $M_{(+1)}$ of equalizer 3'P. On the other hand, the input signal of adder 6Q of FIG. 3 is taken from the multiplier $M_{(-1)}$ of equalizer 3Q as in the previous embodiment.

If multipath fading of non-minimum mode occurs, eye comparator 12 determines that the signal from adder 5P has a greater eye aperture than the signal from adder 5Q and allows the output of multiplier 7P to be passed through gate 13 to VCO 9. In multipath fading of minimum mode occurs, eye comparator 12 determines that the signal from adder 5Q has a greater eye aperture and allows the output of multiplier 7Q to be passed through gate 13 to VCO 9. Therefore, in either modes of multipath fading, a valid bit timing control signal can be derived from one of the multipliers 7P and 7Q.

Figure 5:
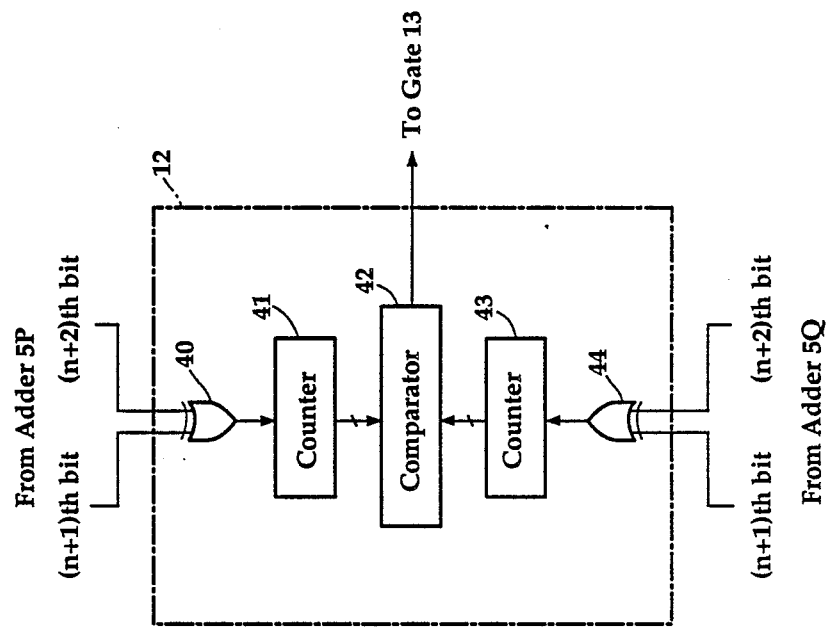
FIG. 5 is an illustration of details of the eye comparator of FIG. 3.

As shown in FIG. 5, the eye comparator 12 comprises exclusive OR gates 40 and 44 respectively coupled to the outputs of adders 5P and 5Q to provide a modulo-2 sum of the "n+1"th and "n+2"th bits of the respective inputs. A logic-1 output from each exclusive OR gate indicates that each of the demodulated signals coincides with the crosspoint of one of the multilevel eye patterns. Thus, the number of logic-1 exclusive-OR outputs generated during a specified period of time indicates the size of an eye aperture. The logical-1 outputs of both exclusive OR gates 40 and 44 are counted respectively binary counters 41 and 43 which are periodically reset in response to clock pulses, not shown. The outputs of counters 41 and 42 are compared against each other by a digital comparator 42. Comparator 42 determines that one of the channel signals having a greater number of logical-1 exclusive-OR outputs has a greater eye aperture and supplies a gate control signal to gate 13 to allow the output of one of multipliers 7P and 7Q having a greater count value to be passed through gate 13 to VCO 9.

While mention has been made of a QAM demodulator, various modifications and alterations are apparent to those skilled in the art without departing from the scope of the present invention which is only limited by the appended claims. For example, the present invention can be modified to process signals containing no quadrature component, such as 2PSK signals. In such instances, the real-axis and imaginary-axis transversal equalizers are connected to the same output of the analog-to-digital converter.

What is claimed is:

1. A demodulator comprising:
   means for demodulating a digitally modulated signal;
   a variable frequency oscillator for generating a clock pulse;
   an analog-to-digital converter for sampling the demodulated signal in response to said clock pulse and converting the sampled signal to a multibit digital signal representing one of multilevels of the sampled signal;
   a real-axis transversal equalizer having a tapped delay line for receiving said digital signal, a plurality of tap weight multipliers connected respectively to taps of said tapped delay line, and an adder for summing all outputs of said tap weight multipliers except for the output of the tap weight multiplier which is connected to a tap adjacent to a center tap of said delay line for producing a partially equalized signal;
   an imaginary-axis transversal equalizer having a tapped delay line for receiving said digital signal, a plurality of tap weight multipliers connected respectively to taps of said tapped delay line, and an adder for summing all outputs of said tap weight multipliers for producing a fully equalized signal;
   first adder means for summing said partially equalized signal and said fully equalized signal;
   second adder means for summing the output of said first adder means with said output which is excluded from being summed by the adder of said real-axis transversal equalizer;
   phase control means for controlling said variable frequency oscillator in accordance with an output signal from said first adder means; and
   tap weight control means for controlling the tap weight multipliers of both of said real-axis transversal equalizer and said imaginary-axis transversal equalizer in accordance with an output signal from said second adder means.

2. A demodulator as claimed in claim 1, wherein said phase control means comprises a multiplier for multiplying a most significant bit and an error bit of the output of said first adder means.

3. A QAM (quadrature amplitude modulation) demodulator comprising:
   means for demodulating a QAM signal and generating an in-phase baseband signal and a quadrature baseband signal;
   a variable frequency oscillator for generating a clock pulse;
   a first analog-to-digital converter for sampling the in-phase baseband signal in response to said clock pulse and converting the sampled in-phase baseband signal to an in-phase multibit digital signal representing one of multilevels of the sampled in-phase baseband signal;
   a second analog-to-digital converter for sampling the quadrature baseband signal in response to said clock pulse and converting the sampled quadrature baseband signal to a quadrature multibit digital signal representing one of multilevels of the sampled quadrature baseband signal;
   a first real-axis transversal equalizer having a tapped delay line for receiving said in-phase digital signal, a plurality of tap weight multipliers connected respectively to taps of said tapped delay line, and an adder for summing all outputs of said tap weight multipliers except for the output of the tap weight multiplier which is connected to a tap adjacent to a center tap of said delay line for producing a first partially equalized signal;
   a first imaginary-axis transversal equalizer having a tapped delay line for receiving said quadrature digital signal, a plurality of tap weight multipliers connected respectively to taps of said tapped delay line, and an adder for summing all outputs of said tap weight multipliers for producing a first fully equalized signal;
   a second real-axis transversal equalizer having a tapped delay line for receiving said quadrature digital signal, a plurality of tap weight multipliers connected respectively to taps of said tapped delay line, and an adder for summing all outputs of said tap weight multipliers except for the output of the tap weight multiplier which is connected to a tap adjacent to a center tap of said delay line for producing a second partially equalized signal;
   a second imaginary-axis transversal equalizer having a tapped delay line for receiving said in-phase digital signal, a plurality of tap weight multipliers connected respectively to taps of said tapped delay line, and an adder for summing all outputs of said tap weight multipliers for producing a second fully equalized signal;
   first adder means for summing said first partially equalized signal and said first fully equalized signal;

second adder means for summing the output of said first adder means with said output which is excluded from being summed by the adder of said first real-axis transversal equalizer;

third adder means for summing said second partially equalized signal and said second fully equalized signal;

fourth adder means for summing the output of said third adder means with said output which is excluded from being summed by the adder of said second real-axis transversal equalizer;

phase control means for controlling said variable frequency oscillator in accordance with one of output signals from said first and third adder means; and tap weight control means for controlling the tap weight multipliers of all of said first and second real-axis transversal equalizers and said first and second imaginary-axis transversal equalizers in accordance with output signals from said second and fourth adder means.

4. A QAM demodulator as claimed in claim 3, wherein said phase control means comprises:

a first multiplier for multiplying a most significant bit and an error bit of the output of said first adder means;

a second multiplier for multiplying a most significant bit and an error bit of the output of said third adder means; and means for summing outputs of said first and second multipliers to produce a phase control signal applied to said variable frequency oscillator.

5. A QAM (quadrature amplitude modulation) demodulator comprising:

means for demodulating a QAM signal and generating an in-phase baseband signal and a quadrature baseband signal;

a variable frequency oscillator for generating a clock pulse;

a first analog-to-digital converter for sampling the in-phase baseband signal in response to said clock pulse and converting the sampled in-phase baseband signal to an in-phase multibit digital signal representing one of multilevels of the sampled in-phase baseband signal;

a second analog-to-digital converter for sampling the quadrature baseband signal in response to said clock pulse and converting the sampled quadrature baseband signal to a quadrature multibit digital signal representing one of multilevels of the sampled quadrature baseband signal;

a first real-axis transversal equalizer having a tapped delay line for receiving said in-phase digital signal, a plurality of tap weight multipliers connected respectively to taps of said tapped delay line, and an adder for summing all outputs of said tap weight multipliers except for the output of the tap weight multiplier which is connected to a tap displaced from a center tap of said delay line in the direction of signals propagating therealong for producing a first partially equalized signal;

a first imaginary-axis transversal equalizer having a tapped delay line for receiving said quadrature digital signal, a plurality of tap weight multipliers connected respectively to taps of said tapped delay line, and an adder for summing all outputs of said tap weight multipliers for producing a first fully equalized signal;

a second real-axis transversal equalizer having a tapped delay line for receiving said quadrature digital signal, a plurality of tap weight multipliers connected respectively to taps of said tapped delay line, and an adder for summing all outputs of said tap weight multipliers except for the output of the tap weight multiplier which is connected to a tap displaced from a center tap of said delay line in a direction opposite to the direction of signals propagating therealong for producing a second partially equalized signal;

a second imaginary-axis transversal equalizer having a tapped delay line for receiving said in-phase digital signal, a plurality of tap weight multipliers connected respectively to taps of said tapped delay line, and an adder for summing all outputs of said tap weight multipliers for producing a second fully equalized signal;

first adder means for summing said first partially equalized signal and said first fully equalized signal;

second adder means for summing the output of said first adder means with said output which is excluded from being summed by the adder of said first real-axis transversal equalizer;

third adder means for summing said second partially equalized signal and said second fully equalized signal;

fourth adder means for summing the output of said third adder means with said output which is excluded from being summed by the adder of said second real-axis transversal equalizer;

an eye comparator for determining which one of outputs of said first and third adder means has an eye pattern with a greater aperture;

phase control means for controlling said variable frequency oscillator in accordance with one of output signals from said first and third adder means in accordance with the determination of said eye comparator; and tap weight control means for controlling the tap weight multipliers of all of said first and second real-axis transversal equalizers and said first and second imaginary-axis transversal equalizers in accordance with output signals from said second and fourth adder means.

6. A QAM demodulator as claimed in claim 5, wherein said phase control means comprises:

a first multiplier for multiplying a most significant bit and an error bit of the output of said first adder means;

a second multiplier for multiplying a most significant bit and an error bit of the output of said third adder means; and gate means for selectively applying one of the output signals from said first and second multipliers as a phase control signal to said variable frequency oscillator in accordance with the determination of said eye comparator.

* * * * *

UNITED STATES PATENT AND TRADEMARK OFFICE
CERTIFICATE OF CORRECTION

PATENT NO. : 4,975,927
DATED     : December 4, 1990
INVENTOR(S) : Yasuharu Yoshida It is certified that error appears in the above-identified patent and that said Letters Patent is hereby corrected as shown below:

Col. 4,   lines 31 & 32   delete "successively formed at the outputs of the delay elements, with a tap".

Signed and Sealed this

Eighteenth Day of August, 1992

Attest:

DOUGLAS B. COMER

*Attesting Officer*            *Acting Commissioner of Patents and Trademarks*